Figure 1:
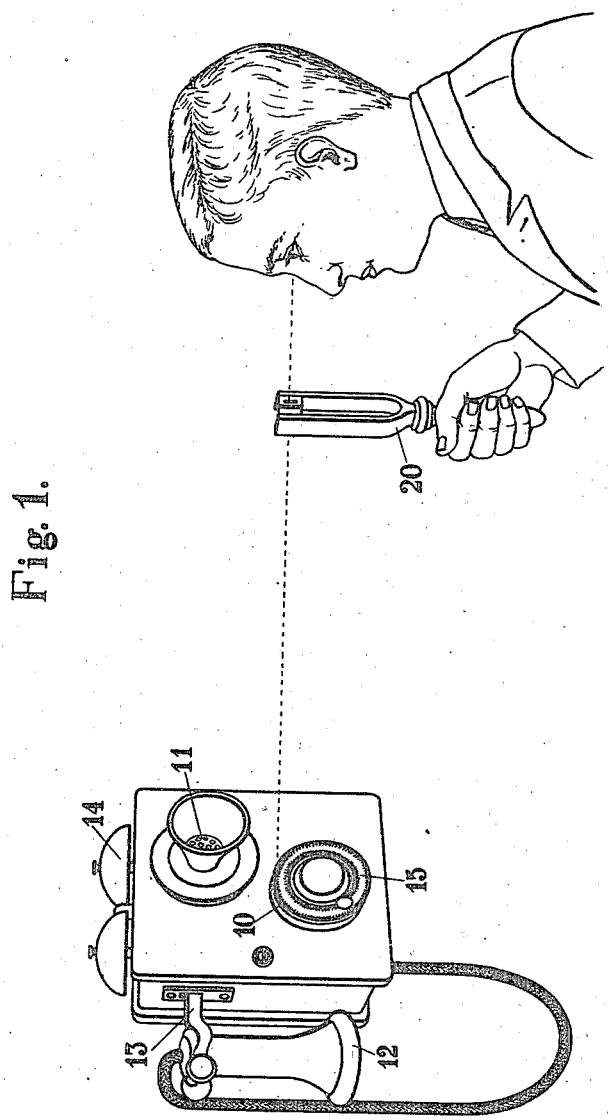

A. H. ADAMS.
APPARATUS FOR DETERMINING THE SPEED OF ROTATION OF IMPULSE TRANSMITTERS.
APPLICATION FILED DEC. 26, 1914.

1,160,356.

Patented Nov. 16, 1915.
2 SHEETS—SHEET 1.

Witnesses:

Inventor:
Arthur H. Adams
by
Att'y.

A. H. ADAMS.
APPARATUS FOR DETERMINING THE SPEED OF ROTATION OF IMPULSE TRANSMITTERS.
APPLICATION FILED DEC. 26, 1914.

1,160,356.

Patented Nov. 16, 1915.
2 SHEETS—SHEET 2.

Witnesses:
O.D.M. Guthe
J.E. Rasmussen

Inventor:
Arthur H. Adams
by A.C. Shuner, Att'y.

UNITED STATES PATENT OFFICE.

ARTHUR H. ADAMS, OF SPARKILL, NEW YORK, ASSIGNOR TO WESTERN ELECTRIC COMPANY, OF NEW YORK, N. Y., A CORPORATION OF ILLINOIS.

APPARATUS FOR DETERMINING THE SPEED OF ROTATION OF IMPULSE-TRANSMITTERS.

1,160,356.                 Specification of Letters Patent.       Patented Nov. 16, 1915.

Application filed December 26, 1914. Serial No. 879,164.

*To all whom it may concern:*

Be it known that I, ARTHUR H. ADAMS, a citizen of the United States, residing at Sparkill, in the county of Rockland and State of New York, have invented certain new and useful Improvements in Improved Apparatus for Determining the Speed of Rotation of Impulse-Transmitters, of which the following is a full, clear, concise, and exact description.

This invention relates to improved method and means for determining and adjusting the speed of rotation of impulse transmitting devices for automatic telephone exchange systems, and relates more particularly to improved method and means whereby it may be readily and accurately determined whether the speed of operation of such impulse transmitting mechanisms is within the maximum and minimum speed limits necessary for the proper operation of the automatic switching apparatus in the telephone exchange with which the substation, at which such impulse transmitting mechanism is located, is associated.

In automatic telephone exchange installations, great difficulty has been experienced in adjusting and maintaining the speed of operation of the subscriber's impulse transmitters or finger wheels within such limits of speed both maximum and minimum as will produce the proper and accurate operation of the automatic switches at the exchange, by which the calling line in response to the operation of such impulse transmitter or finger wheel is extended to a desired line. This difficulty is particularly met with when the impulse mechanism or finger wheel is installed in the substation, although it is none the less met with when, after assembly, the impulse mechanism or finger wheel is being adjusted before installation. It has been the practice heretofore when the finger wheel is already installed and trouble has been experienced with it, which indicates that it is running either too fast or too slow, to connect the line with which such finger wheel is associated to a step-by-step switch or similar piece of apparatus upon a wire chief's desk in the central office, and the finger wheel being then operated by an inspector at the substation, the wire chief will report whether the operation of such finger wheel is either too fast or too slow, the inspector from time to time in response to the reports of the wire chief, changing the tension of the operating spring of the finger wheel, or the friction of the governor which controls its movement, until the finger wheel rotates at such a speed that it satisfactorily operates the switch before the wire chief. Substantially the same procedure has been required in testing impulse mechanisms of this character after assembly and before installation. Obviously this method of determining and adjusting the speed of finger wheels by extended experimentation is clumsy, inefficient, and unsatisfactory. Other methods have been tried and found unsatisfactory, as for example the use of a stop-watch to measure the speed of movement of the finger disk, which method, owing to the relatively short duration of movement of the disk and the large personal equation entering into this mode of measurement, has been found inefficient and inaccurate.

One of the features of the present invention is to provide a method and apparatus whereby it may be instantly determined whether the speed of the movement of the impulse transmitter or finger wheel is within the necessary maximum or minimum limits, or if it is not within such limits, whether it is above the required maximum limit or below the required minimum limit. Further, by means of the present invention, no connection of the impulse transmitter under test is necessary with any switch, in fact no electrical connections are necessary at all in connection with the test, and only such tools are required as may be readily carried by an inspector to the subscriber's station, and the test may be made without in any way disturbing the subscriber's line or interfering with the reception of incoming calls over such line during the test.

Another distinctive feature of the invention is that it provides a method for the purpose described which eliminates entirely any personal equation of the person making the test, and leaves no room for improper personal judgment or error.

Figure 2:
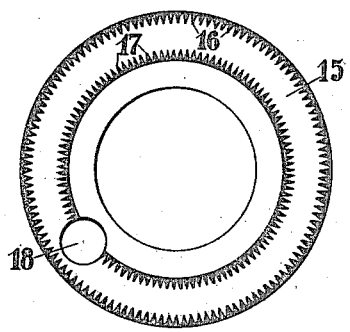
Figure 3:
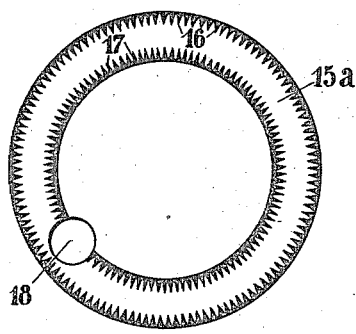
Figure 4:
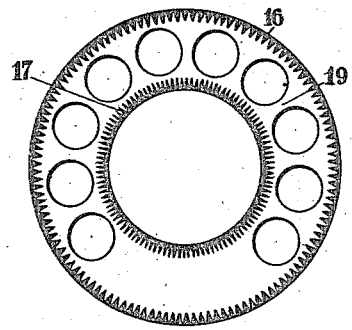
Figure 5:
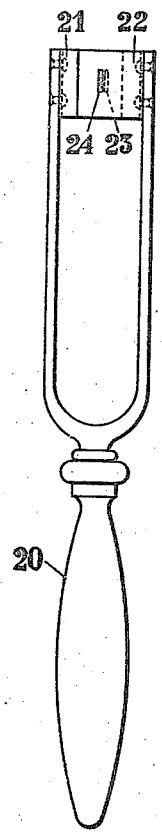

Referring to the drawings—Figure 1 shows in perspective the manner in which the improved method and apparatus embodying the invention herein may be utilized. Fig. 2 represents an indicator card such as is used in the test illustrated in Fig. 1. Fig. 3 shows a modified form of indicator card. Fig. 4 shows a modification of the invention in which no indicator card is necessary, the function of the indicator card being combined with the finger disk of the impulse transmitter itself. Fig. 5 illustrates a tuning fork of ordinary construction, adapted for use in connection with the present invention.

The usual impulse transmitting mechanism or finger wheel is illustrated at 10 attached to the casing of the subscriber's telephone instrument which carries the usual transmitter 11, receiver 12, hookswitch 13, ringer 14, and so forth. The electrical connection between the various parts referred to, and between the substation set and the central exchange, since they are not necessary for an understanding of the present invention, are not shown, and will not be described.

15 represents an indicator card which may be attached by any desired means to the finger disk of the impulse transmitter 10. This indicator is formed of a circular piece of cardboard of substantially the same size as the finger disk of the impulse transmitting mechanism. It is provided on its face with circumferentially arranged printed or stamped projections 16, as shown, such projections extending inwardly toward the center of the disk. Somewhat nearer the center of the disk than the projections 16, the disk is provided with circularly arranged outwardly extending printed or stamped projections 17. The disk is also provided with a finger hole 18 which will usually, in the use of the disk, be placed adjacent the opening on the finger disk of the impulse transmitter most removed from the stop position of such impulse transmitter when the finger disk thereof is moved in a clockwise direction in the operation of the impulse transmitter to send a digit of the desired line.

It has been found that the speed at which impulse transmitting mechanisms of the type referred to operate at greatest efficiency is at the rate of twelve impulses per second. In impulse transmitting mechanisms of the type of which the finger disk is shown in Fig. 4 this gives a speed of rotation of such finger disk of 24/25ths of a revolution per second. It has been further determined by careful experiment that safe maximum and minimum speeds of rotation of finger disks of this type are respectively 25/25ths of a revolution per second and 22/25ths of a revolution per second.

The indicator card 15, or in the modified form the indicator card 15ª, or the finger disk itself 19 as shown in Fig. 4, are therefore provided with 110 outwardly extending printed or stamped projections 17 and with 125 inwardly extending printed or stamped projections 16. The manner and form in which these projections are printed or impressed upon the indicator cards or finger disks is immaterial, it only being required that they should be readily visible and preferably, therefore, should be of contrasting color to the card or disk upon which they appear.

To coöperate with the card or disk in the test there is provided a tuning fork 20 as shown in Figs. 1 and 5, such tuning fork having attached respectively to the ends of its vibrating arms the shutters 21, 22. Each of these shutters has formed therein a slit, respectively 23 and 24, which are adapted to register with each other, when the fork is vibrating, twice for each cycle of vibration of such fork. These slits are therefore preferably arranged that when the fork is not in vibration they register approximately with each other, but when the fork is vibrating they register with each other for a brief period twice only during a cycle of vibration. In Fig. 5, in order to show the construction more clearly, the slits are shown out of alinement in the position in which they would be when the vibrating arms of the tuning fork are nearest to each other in a cycle of vibration.

In order to coöperate with the particular arrangement of the printed or stamped projections upon the cards or finger disks the tuning fork should have a periodicity of 55 cycles per second. When this fork is caused to vibrate in the usual manner, the openings 23, 24 in the shutters 21, 22 will register with each other 110 times per second.

The apparatus heretofore referred to is used in the test in the manner of the well-known stroboscope. The observer having started the tuning fork in vibration rotates the finger disk of the impulse transmitting mechanism with the indicated card 15 or 15ª attached thereto, or if the finger disk is itself provided with the printed or stamped projections as in the form shown in Fig. 4, rotates such disk without an indicator card, in the setting direction until it has been moved to its full extent in such direction. He then releases the slits 23, 24 on the tuning fork the movement of the printed or stamped projections upon the card or disk.

The movement of the disk or card at this time is in a counter-clockwise direction. If the disk or card is moving at this time at a rate of speed precisely 25/25ths of a revolution per second, the printed or stamped projections 17 as viewed through the alined slits of the tuning fork will be standing still. This is for the reason that such printed or stamped projections 17, each occupy an arc of 1/110th of the circle on which they are formed, and as the observer obtains glimpses of such projections at the rate of just 110 glimpses per second, he will see a tooth at each successive glimpse in precisely the same position that the preceding tooth was at his last glimpse. No movement, therefore, of the projections 17 will be apparent to the observer if, as assumed, the speed of rotation of the card or disk is at precisely the rate of 25/25ths of a revolution per second. At this same speed the projections 16 as they each occupy an arc of 1/125th of the circle on which they are formed will appear to be moving in a counter-clockwise direction, since between each two glimpses obtained by the observer of such projections 16 the card or disk will have moved not only the angular displacement of one of such projections, but also in addition the displacement of a fraction of one of such projections. At the assumed speed, therefore, that is, the speed of 25/25ths of a revolution per second, the projections 17 will appear to the observer to be standing still, and the projections 16 to be moving in a counter-clockwise direction. If the speed of rotation of the card or disk is greater than the allowed maximum, not only will the projections 16 appear to be moving in a counter-clockwise direction, but since the card or disk moves a trifle more than the angular displacement of one of the projections 17 between each two glimpses of the card or disk by the observer, such teeth 17 will also appear to be moving in a counter-clockwise direction. In this case the observer will know that the speed of rotation of the finger disk and the consequent operation of the impulse producing mechanism is too great. Assuming on the other hand, that the speed of rotation of the finger disk is at the rate of 22/25ths of a complete rotation per second, which is the minimum desired speed, the observer will detect no movement in the projections 16 since the movement of the card or disk under the present assumption is such that between each two glimpses by the observer of the projections 16, the disk has moved just the angular displacement of one of such projections 16. On the other hand at the speed assumed, the projections 17 will appear to the observer to be moving in a clockwise direction as between each two glimpses by the observer the card or disk has not moved quite the angular displacement of one of the projections 17, therefore, the observer gazing at a particular point will at one glimpse see at such point a projection 17, and at the next glimpse will see the next projection 17 almost moved into the position in which he saw the first projection referred to, but since it has not quite reached it, it will appear to the observer as though the projection which he first saw had moved slightly in a clock-wise direction. Therefore, at the minimum desired speed it will be apparent that to the observer the projections 16 will be without motion, whereas the projections 17 will appear to be moving in a clock-wise direction. If the speed of rotation of the card or disk is below the minimum desired speed, both such sets of projections will appear to be moving in a clock-wise direction, naturally the projections 17 at a higher speed than the projections 16. Obviously such motion in a clock-wise direction is apparent and not real.

If the speed of the impulse transmitting mechanism under observation is between the maximum and minimum limits referred to, the projections 16 upon the card or disk will appear to be moving in a counter-clockwise direction, the movement of the disk being more than the angular displacement of one of such projections 16 between each two glimpses by the observer, and the projections 17 will appear to be moving in a clockwise direction since the angular displacement of the card or disk between each two glimpses by the observer is less than the angular displacement of one of such teeth 17.

It will be apparent, therefore, that by the use of the method and apparatus described, the observer will be able to instantly detect whether the speed of the impulse transmitting mechanism is within the desired limits, or, if it is not, whether it is above or below such desired limits. If the speed of rotation is not correct the observer knowing immediately by the direction of the movement of the projections whether such speed is too high or too low, he may intelligently proceed in the usual manner to correct the defect.

It will be obvious that for the tuning fork shown and described herein there may be substituted any other device by which a slit opening could be presented before the observer with a frequency as in the case assumed, for example, of 110 per second. It will also be obvious that the invention may be adapted to any desired maximum or minimum speeds of rotation, and that the number of projections stamped or printed upon the card or disk may be changed either with or without a corresponding change in the periodicity of the tuning fork or equivalent device. Furthermore the invention is adapted to be used with but a single row of projections upon the card or disk, if it is sufficient that the observer should be able to determine the speed of rotation is, or approximates, a certain speed.

What is claimed is:

1. An indicator used in combination with a stroboscope for determining the speed of calling devices for automatic telephone exchanges, marked with a series of circumferentially arranged indications, and suitably mounted on the rotating dial of the calling device.

2. An indicator used in combination with a stroboscope for determining the speed of calling devices for automatic telephone exchanges, marked with two series of circumferentially arranged indications of different number per sector, and suitably mounted on the rotating dial of the calling device.

In witness whereof, I hereunto subscribe my name this 23rd day of December A. D., 1914.

ARTHUR H. ADAMS.

Witnesses:
E. EDLER,
K. L. STAHL.